No. 679,107.   
H. A. BUCK.  
HOT WATER TANK.  
(Application filed Dec. 28, 1900.)  
Patented July 23, 1901.
(No Model.)
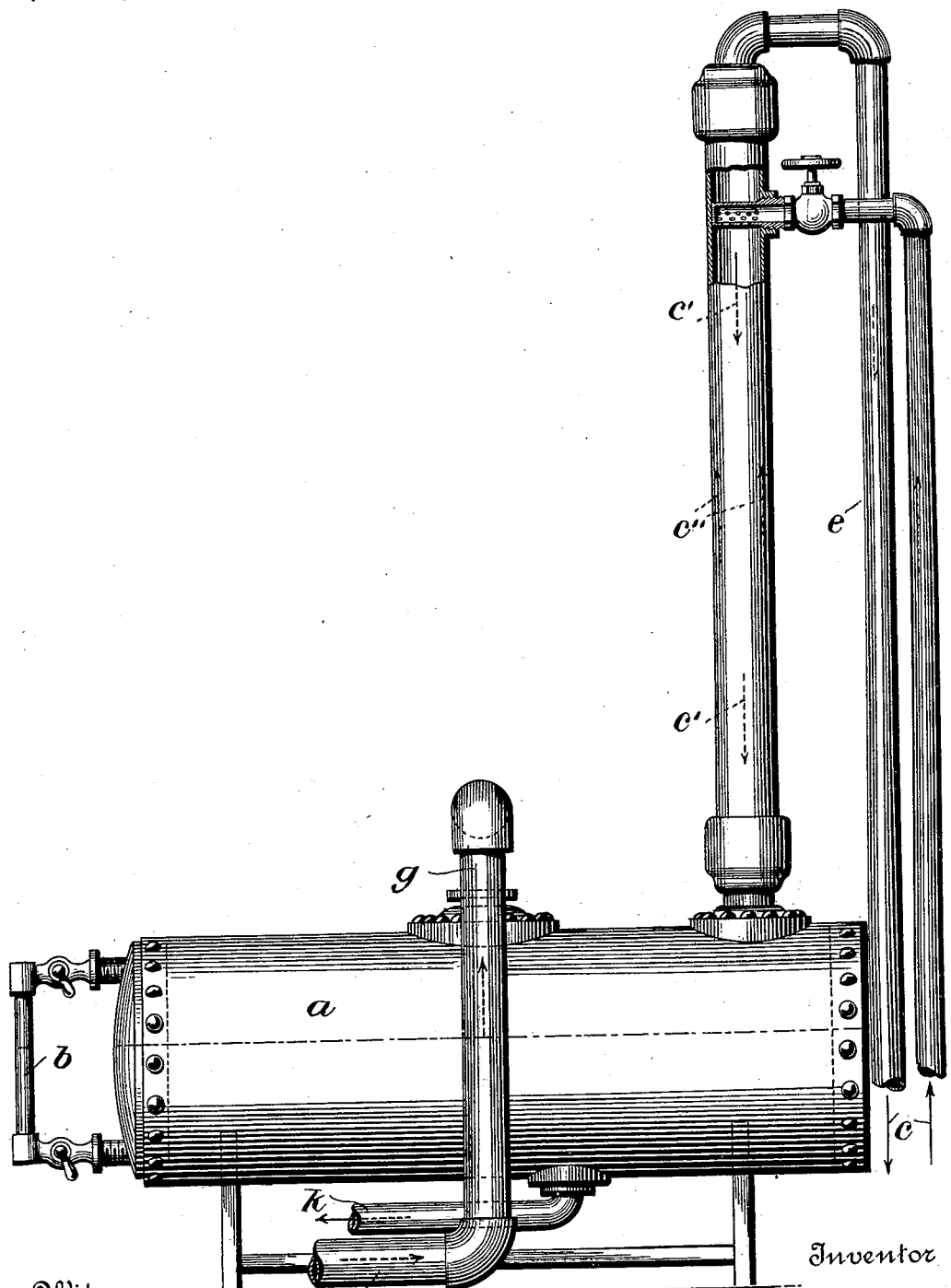
Witnesses  
Inventor  
H. A. Buck  
Attorneys

United States Patent Office.

HENRY ALONZO BUCK, OF WEST STAFFORD, CONNECTICUT.

HOT-WATER TANK.

SPECIFICATION forming part of Letters Patent No. 679,107, dated July 23, 1901.

Application filed December 28, 1900. Serial No. 41,391. (No model.)

*To all whom it may concern:*

Be it known that I, HENRY ALONZO BUCK, engineer, a citizen of the United States of America, and a resident of West Stafford, Connecticut, at present residing at 37 Fruchtstrasse, Berlin, Germany, have invented new and useful Improvements in Hot-Water Tanks, of which the following is a specification.

My invention relates to a new form of a hot-water tank which is used in combination with the condenser-pump, so that even the last quantities of steam are condensed and used for the purpose of heating the fresh water.

The new tank forming the object of my invention differs from those tanks known till now in that it is totally closed and its cover being provided with a vertical tube within which the vapors condense by coming in contact with the cold water flowing downward into the tank. By my new construction the drawback of the tanks now in use is done away with, which drawback consists in that they continuously emit vapors, which means a loss of heat and becomes detrimental to the rooms and mechanism in the neighborhood of the tank.

I have shown in the accompanying drawing my water-tank in side elevation.

$a$ is the tank which contains the hot water and which may be provided with a gage-glass $b$. The water is conducted into the tank by a tube $c$ and flows down through the long vertical tube $d$, as indicated by the arrows $c'$. The interior of the tube $d$ may be shaped in such a manner that the down-flowing water offers a large contact-surface to the vapors which ascend within the tube $d$ in the direction of the arrows $c''$. It is evident that the fresh water from the tube $c$ must condense completely the vapors of the water-tank which ascend through the tube $d$. The upper part of this tube $d$ communicates into a tube $e$, leading into the atmosphere. The water is taken from the tank through the pipe $f$, which leads to the boiler-feed pump. Besides that, the tank has an inlet-tube $g$, through which enter the hot water and the vapors from the condenser-pump. These vapors consist of steam and atmospheric air, and it is evident that all the steam is condensed in the tank and in the vertical tube $d$, while the air will pass through the tube $e$, which may open into the atmosphere.

Having now particularly described and ascertained the nature of my invention and the manner in which it may be performed, I declare that what I claim is—

1. In a condenser, the combination with a tank, an inlet entering the top of said tank for conveying steam and hot water thereto, and a water-outlet at the bottom of said tank; of a vertical stand-pipe entering the top of said tank, a cold-water pipe entering said stand-pipe at the top thereof provided with means for condensing the vapors within said pipe, and an outlet communicating with the top of said stand-pipe, substantially as described.

2. In a condenser, the combination with a tank, an inlet entering the top of said tank for conveying steam and hot water thereto, a water-outlet at the bottom of said tank, and a gage-glass at one end of said tank for indicating the height of water therein; of a vertical stand-pipe entering the top of said tank, a cold-water pipe entering said stand-pipe at the top thereof provided with means for condensing the vapors within said pipe, and an outlet communicating with the top of said stand-pipe, substantially as described.

In testimony whereof I have signed my name to this specification in the presence of two subscribing witnesses.

HENRY ALONZO BUCK.

Witnesses:
WOLDEMAR HAUPT,
HENRY HASPER.